Sept. 6, 1927.
H. H. IRWIN
GLARESHIELD
Filed June 2, 1926
1,641,889
2 Sheets-Sheet 1
Fig. 1.
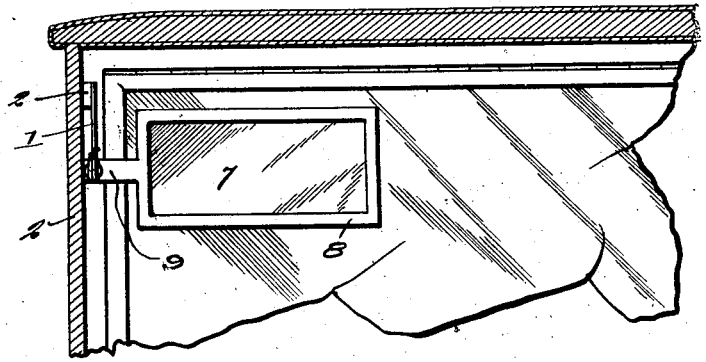
Fig. 5.
Fig. 6.
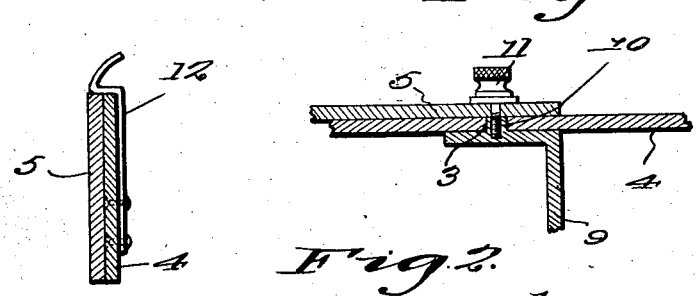
Fig. 2.
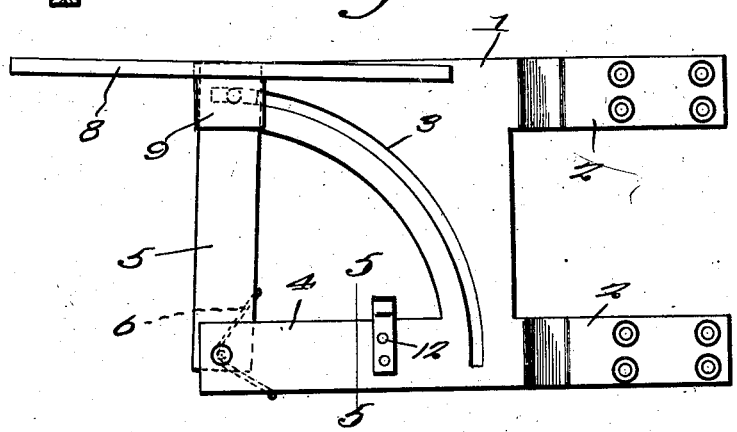
H. H. Irwin
INVENTOR
BY Victor J. Evans
ATTORNEY
WITNESS:

Sept. 6, 1927.
H. H. IRWIN
GLARESHIELD
Filed June 2, 1926
1,641,889
2 Sheets-Sheet 2
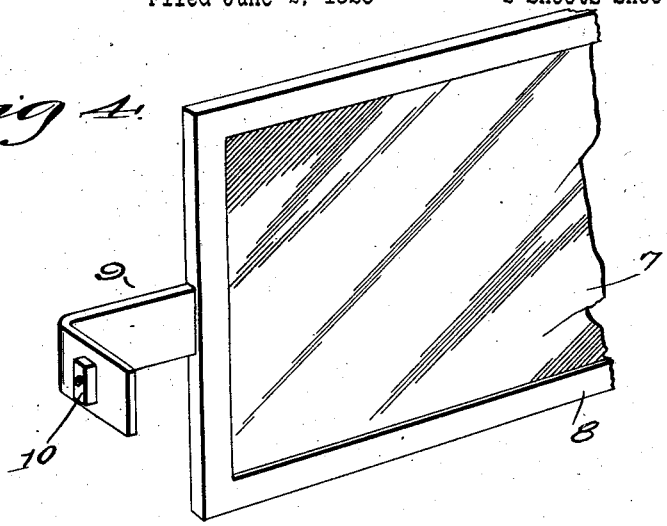
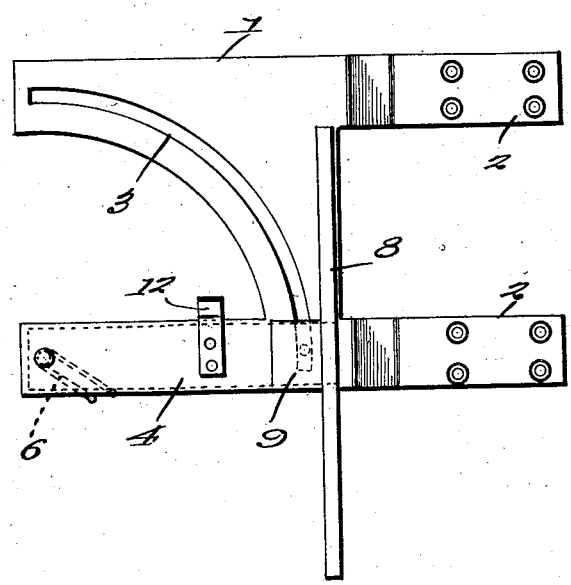
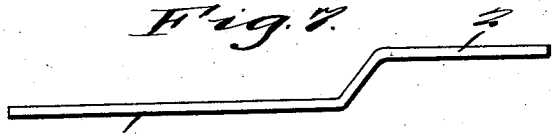
H. H. Irwin INVENTOR
BY
ATTORNEY Patented Sept. 6, 1927.

1,641,889

UNITED STATES PATENT OFFICE.

HENRY H. IRWIN, OF GREENVILLE, SOUTH CAROLINA.

GLARE SHIELD.

Application filed June 2, 1926. Serial No. 113,226.

This invention relates to an attachment for the windshield of a motor vehicle or other vehicle, the general object of the invention being to provide a small frame having a transparent member therein which will act as an anti-glare device, with means for shifting the frame to either a position where the driver can look through the transparent member or to a position where the transparent member is out of the line of vision of the driver.

Another object of the invention is to provide spring means for normally holding the device in inoperative position, with latch means for holding it in operative position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary sectional view through a motor vehicle, showing the invention in use.

Figure 2 is a side view of the device, with the transparent member in inoperative position.

Figure 3 is a similar view but showing the transparent member in operative position.

Figure 4 is a fragmentary perspective view of the transparent member and its frame.

Figure 5 is a section on line 5—5 of Figure 2.

Figure 6 is a sectional view showing the connection between the arm of the frame and the lever.

Figure 7 is an edge view of the supporting frame.

In these views, 1 indicates the supporting frame which is provided with a pair of offset arms 2 which are adapted to be fastened to an interior wall of the vehicle, as shown in Figure 1, so that the major portion of the frame is spaced slightly from said wall. This major portion of the frame has an arc-shaped slot 3 therein and a horizontal arm 4 projects outwardly to a point in vertical alignment with the upper extremity of said major portion. A lever 5 is pivoted at its lower end to the extremity of said arm 4 and a spring 6 tends to hold said lever in upright position. A transparent member 7 is carried by a frame 8 and said frame has at one end an angle arm 9 which has a block 10 thereon which engages the slot 3 and said arm is connected with the lever 5 by a screw bolt 11 which passes through the lever and through the block 10 into the arm. A spring latch 12 is carried by the arm 4 and will engage the lever 5 when the same has been moved downwardly into horizontal position and hold said lever in this position. In this position of the lever, the frame 8 will be in vertical position in the line of vision of the driver of the vehicle, as shown in Figures 1 and 3 so that the driver must look through the transparent member 7 in order to see the road ahead. This member 7 is of such a color that it will act as a filter to prevent blinding rays of light from reaching the eyes of the driver, thus preventing him from being blinded by the headlights of other vehicles or by the sun. When the lever 5 is in vertical position, the frame 8 and its transparent member will be in horizontal position, as shown in Figure 2, so that the driver will look under the same and thus the device will be out of his line of vision.

From the foregoing, it will be seen that I have provided a simple and inexpensive device for preventing a driver of a vehicle from being blinded by the sun or by the headlights of other vehicles, it being simply necessary for the driver to push upon the lever 5 to move it from a vertical position to a horizontal position where it will be caught and held by the latch 12, to move the transparent member 7 in his line of vision. When the device is not to be used, the latch 12 is moved to releasing position so as to permit the spring 6 to return the parts to inoperative position.

It is thought from the foregoing description that the advantages and novel features of my invention will be readily apparent.

I desire it to be understood that I may make changes in the construction and in the combination and arrangements of the several parts, provided that such changes fall within the scope of the appended claims.

What I claim is:—

1. An anti-glare device for a vehicle comprising a supporting frame having an arc-shaped slot therein, a lever pivoted to the frame, a second frame, a transparent member carried thereby, an arm on the second frame having a projection thereon engaging the slot, means for connecting the arm with the lever, such means passing through the projection, means for holding the lever in its lowered position and means for holding the lever in its raised position.

2. An anti-glare device for a vehicle comprising a supporting frame having an arc-shaped slot therein, a lever pivoted to the frame, a spring for holding the lever in raised position, a second frame, a transparent member carried thereby, an arm on the second frame having a projection thereon engaging the slot, means for connecting the arm with the lever, such means passing through the projection and a latch for holding the lever in its lowered position.

In testimony whereof I affix my signature.

HENRY H. IRWIN.